US00RE49005E

(19) United States
(12) Reissued Patent
Bergman et al.

(10) Patent Number: US RE49,005 E
(45) Date of Reissued Patent: Apr. 5, 2022

(54) TRIPOD CAMERA MOUNT

(71) Applicant: GoPro, Inc., San Mateo, CA (US)

(72) Inventors: Senka Agic Bergman, Montara, CA (US); Nicholas Vitale, Foster City, CA (US); Erik Jorgensen, San Francisco, CA (US)

(73) Assignee: GoPro, Inc., San Mateo, CA (US)

(21) Appl. No.: 29/797,572

(22) Filed: Jul. 1, 2021

Related U.S. Patent Documents

Reissue of:
(64) Patent No.: Des. 852,874
Issued: Jul. 2, 2019
Appl. No.: 29/648,880
Filed: May 24, 2018

U.S. Applications:
(63) Continuation of application No. 29/596,331, filed on Mar. 7, 2017, now Pat. No. Des. 822,092.

(51) LOC (13) Cl. ..... 16-05
(52) U.S. Cl.
USPC ..... D16/245
(58) Field of Classification Search
USPC ..... D16/219, 237, 244, 245; D14/238, 253
(Continued)

(56) References Cited

U.S. PATENT DOCUMENTS 5,341,185 A * 8/1994 Nakatani ..... F16M 11/28 248/169
D415,805 S 10/1999 Wygonik
(Continued)

OTHER PUBLICATIONS

Luxebell Selfie Stick Telescoping with Tripod Stand Mount for Gopro Hero4 3+ 3. [online] Published on Nov. 8, 2016. Retrieved Jan. 19, 2018 from URL:http://www.luxebell.net/home/27 -l uxebell-se lfie-stick-telescoping-with-tripod-stand-mou nt-for-gopro-hero4-3-3-hero-led-session-cell-phones.html (3 pages).
(Continued)

*Primary Examiner* — Philip S Hyder
(74) *Attorney, Agent, or Firm* — Young Basile Hanlon & MacFarlane, P.C.

(57) CLAIM

The ornamental design for a tripod camera mount, as shown and described.

DESCRIPTION

This application is a *broadening reissue of U.S. Pat. No. D. 852,874, which granted from U.S. application Ser. No. 29/648,880, filed on May 24, 2018, which is a* continuation of U.S. application Ser. No. 29/596,331, filed on Mar. 7, 2017, *now U.S. Pat. No. D. 822,092,* the entire [disclosure] *disclosures* of which [is] *are* incorporated by reference herein.

FIG. 1 is a [front, top, and right] *rear, bottom and left* perspective view of a tripod camera mount *showing the new design*;
FIG. 2 is [a rear, bottom, and left perspective] *front elevation* view thereof;
FIG. 3 is a [front] *rear elevation* view thereof;
FIG. 4 is a [rear] *left side elevation* view thereof;
FIG. 5 is a [left] *right side elevation* view thereof;
FIG. 6 is a [right] *top plan* view thereof; *and,*
FIG. 7 is a [top] *bottom plan* view thereof[; and,
FIG. 8 is a bottom view thereof].

The ornamental design which is claimed is shown in solid lines in the drawings. The broken lines in the drawings form no part of the claimed design. Broken lines formed by equal length dashes (i.e., dash-dash) show unclaimed subject matter. Broken lines form by unequal length dashes (i.e., dash-dot) define bounds of the claimed design.

1 Claim, 15 Drawing Sheets

Matter enclosed in heavy brackets [ ] appears in the original patent but forms no part of this reissue; matter printed in italics indicates the additions made by reissue.

[New]

(58) Field of Classification Search
CPC ..... F16M 11/046; F16M 11/24; F16M 2200/024; F16M 2200/028
See application file for complete search history.

(56) References Cited

U.S. PATENT DOCUMENTS

| | | | | | |
|---|---|---|---|---|---|
| D463,877 | S | * | 10/2002 | Kung | D26/38 |
| D505,442 | S | | 5/2005 | Watters | |
| D508,938 | S | | 8/2005 | Watters | |
| D532,436 | S | | 11/2006 | Kruse | |
| D533,578 | S | | 12/2006 | Oka | |
| D552,660 | S | | 10/2007 | Lee | |
| D620,491 | S | * | 7/2010 | Wu | D14/411 |
| D632,720 | S | | 2/2011 | Barker | D16/244 |
| D670,752 | S | * | 11/2012 | Barber | D16/242 |
| D705,468 | S | | 5/2014 | Tompkin | |
| D714,775 | S | | 10/2014 | Ahn | |
| D718,365 | S | | 11/2014 | Hayashi | |
| D739,456 | S | | 9/2015 | Poli | |
| 9,298,066 | B1 | * | 3/2016 | Fan | G03B 17/561 |
| D766,230 | S | * | 9/2016 | Shepard | D14/253 |
| D772,027 | S | * | 11/2016 | Chi Man | D8/14 |
| D800,206 | S | | 10/2017 | Ham | |
| 9,810,974 | B2 | * | 11/2017 | Chi | G03B 17/561 |
| D821,483 | S | * | 6/2018 | Vitale | D16/244 |
| D822,092 | S | * | 7/2018 | Bergman | D16/243 |
| 10,047,901 | B2 | * | 8/2018 | Hida | F16M 11/242 |
| D857,085 | S | * | 8/2019 | Yamaguchi | D16/244 |
| D860,298 | S | * | 9/2019 | Balmer | D16/244 |
| 2005/0092878 | A1 | * | 5/2005 | Murray | G01C 15/002 248/171 |
| 2017/0370518 | A1 | * | 12/2017 | Hida | F16M 11/2021 |
| 2019/0128469 | A1 | * | 5/2019 | Lu | F16M 11/2064 |

OTHER PUBLICATIONS

Smatree Go Pro Accessories—Smapole Q3 Telescoping Go Pro Pole. [online] Retrieved Jan. 19, 2018 from URL:https:// www.alibaba.com/product-detail/Smatree-Go-pro-Accessories-SmaPole-Q3 60258252130.html (14 pages).

Luxebell Selfie Stick Telescoping with Tripod Sand Mount for Gopro Hero4 3+3. [online] Published on Nov. 8, 2016. Retrieved Jan. 19, 2018 from URL:http://www.luxebell.net/home/27-luxebell-selfie-stick-telescoping-with-tripod-stand-mount-for-gopro-hero4-3-3-hero-led-session-cell-phones.html (3 pages).

* cited by examiner

FIG. 1 [CANCELED]

FIG. 2 [CANCELED]

FIG. 3 [CANCELED]

FIG. 4 [CANCELED]

FIG. 5 [CANCELED]

FIG. 6 [CANCELED]

[CANCELED]

[CANCELED]

Figure 1:
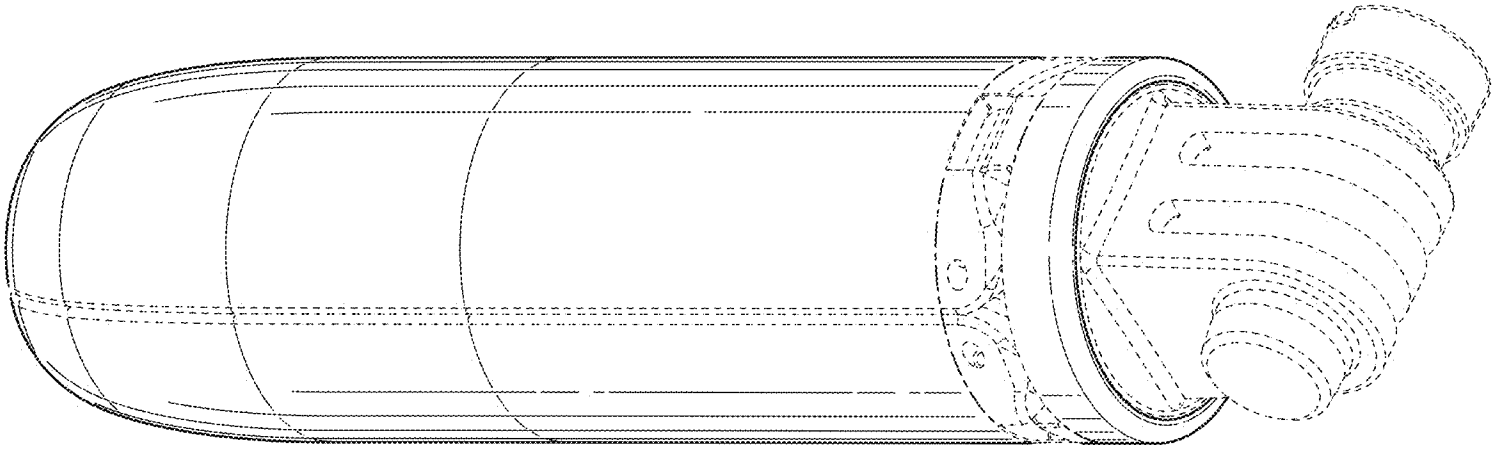

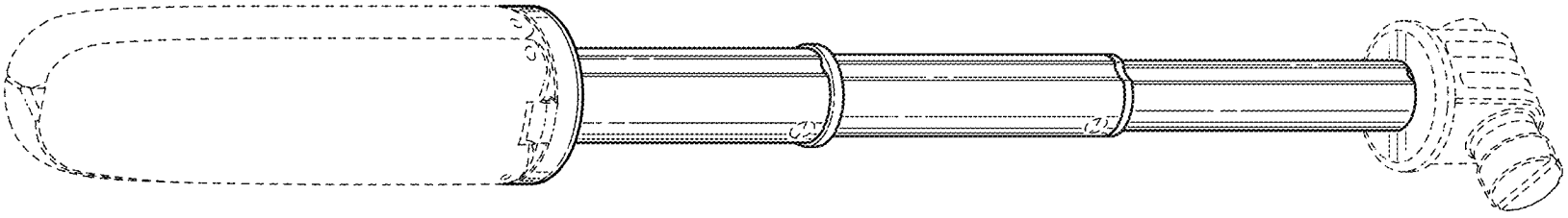
FIG. 1
[New]

Figure 2:
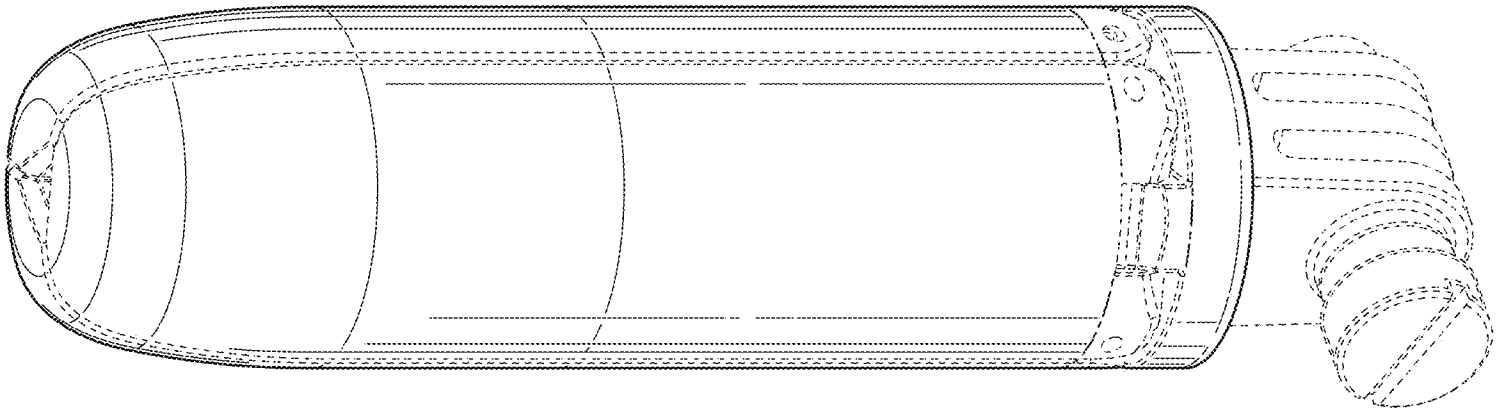

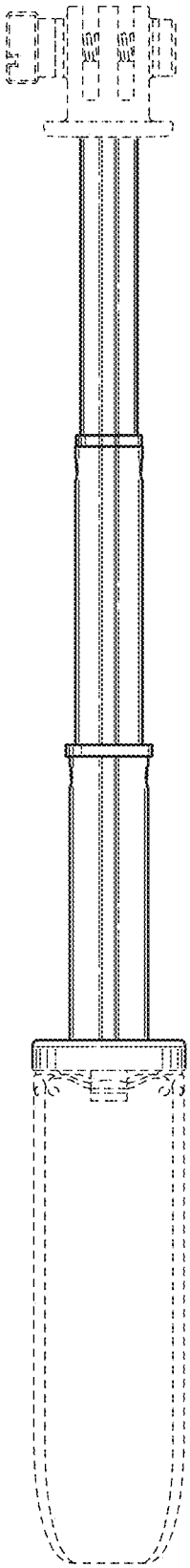
FIG. 2
[New]

Figure 3:
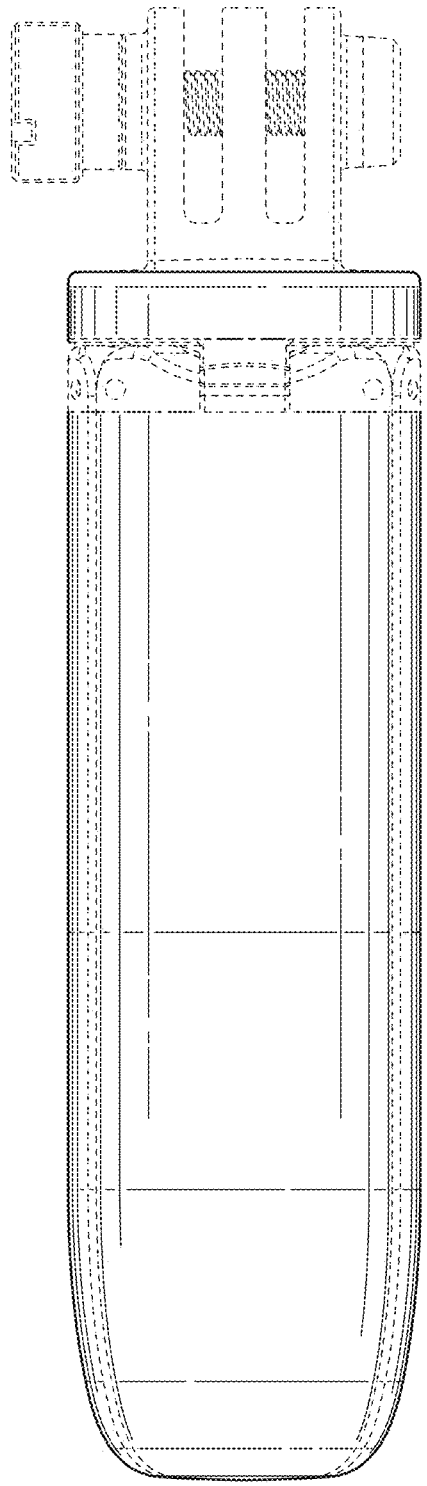

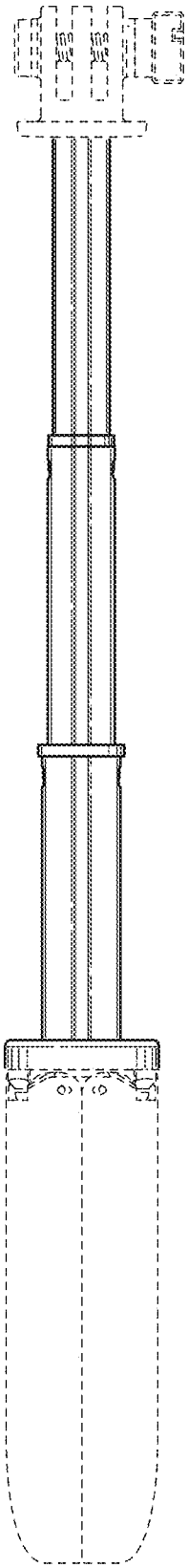
FIG. 3
[New]

Figure 4:
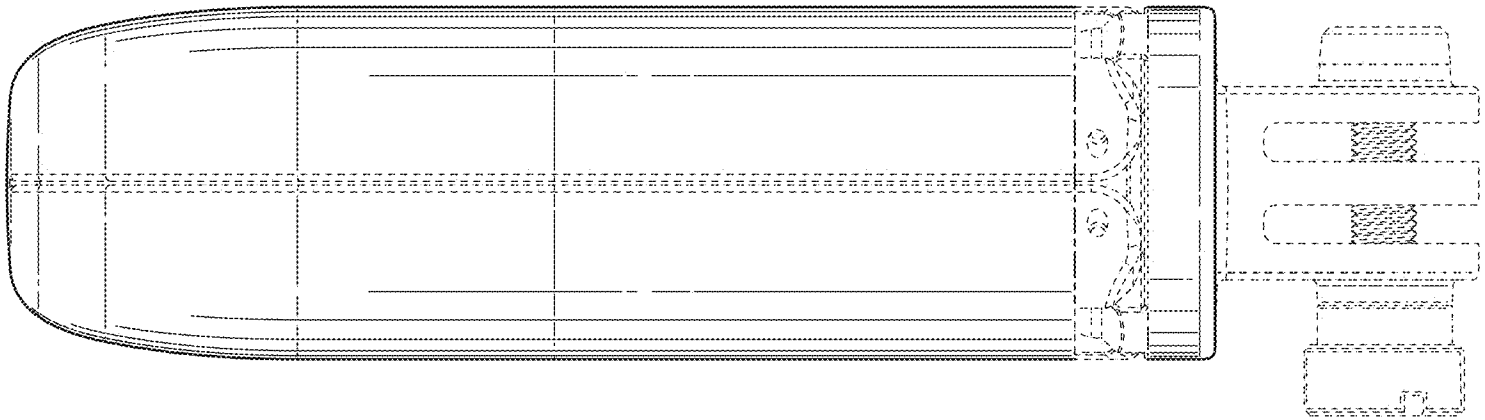

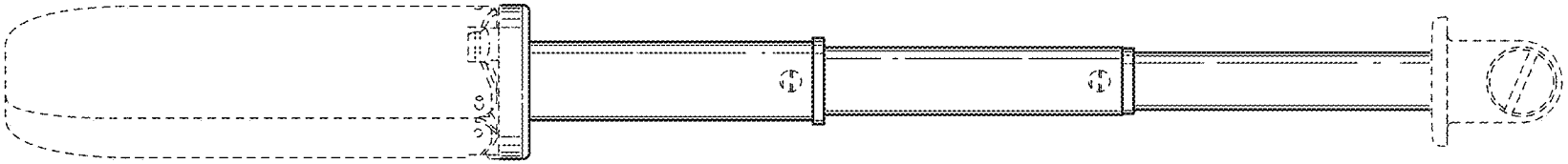
FIG. 4
[New]

Figure 5:
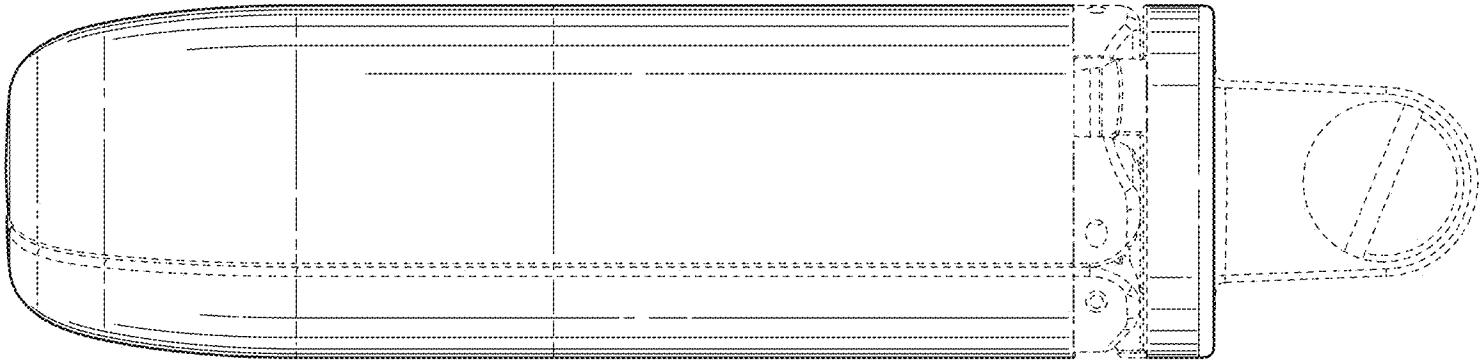

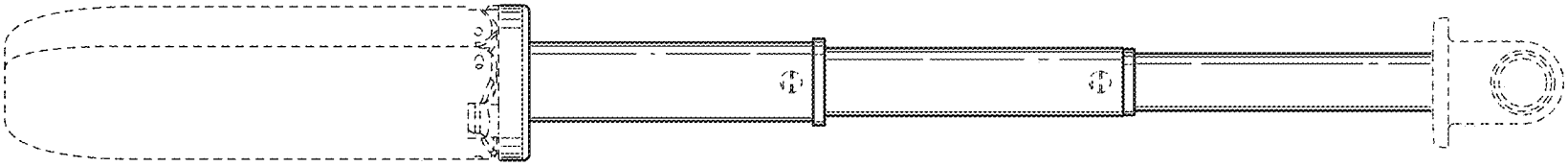
FIG. 5
[New]

Figure 6:
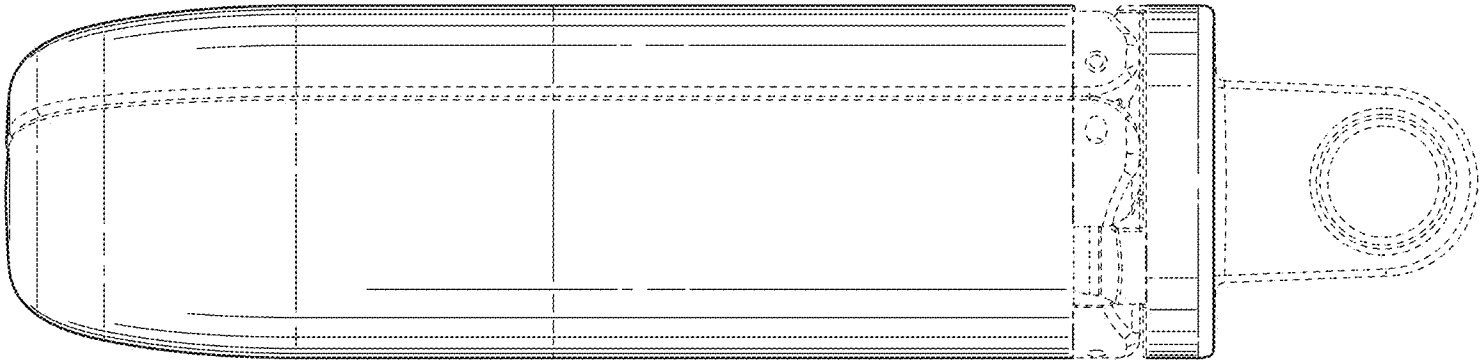

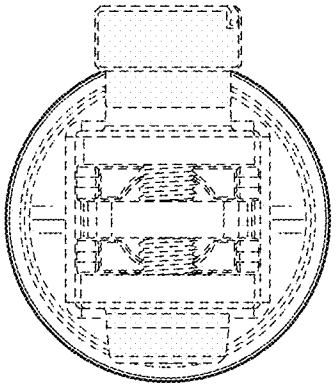
FIG. 6
[New]

Figure 7:
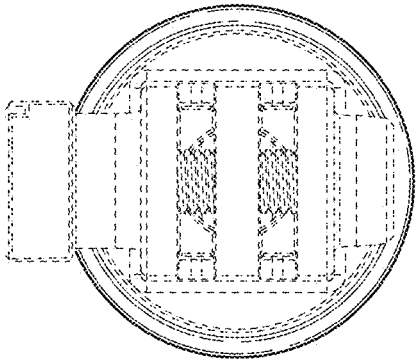
Figure 8:
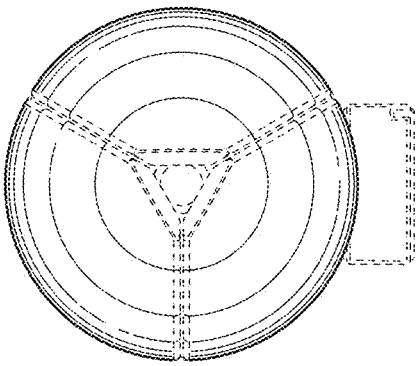

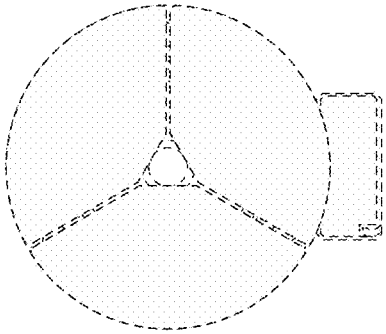
FIG. 7
[New]